United States Patent [19]
Roff

[11] Patent Number: 5,500,911
[45] Date of Patent: Mar. 19, 1996

[54] LENSED OPTICAL FIBER ASSEMBLY AND PROCESS FOR ALIGNMENT WITH AN ACTIVE DEVICE

[75] Inventor: Robert W. Roff, Westfield, N.J.

[73] Assignee: The Whitaker Corporation, Wilmington, Del.

[21] Appl. No.: 286,723

[22] Filed: Aug. 5, 1994

[51] Int. Cl.[6] ........................................ G02B 6/32
[52] U.S. Cl. ........................ 385/33; 385/31; 385/52; 385/76; 385/77; 385/88
[58] Field of Search .................. 385/15, 31, 33, 385/34, 38, 39, 49, 52, 74, 76, 77, 78, 84, 88, 90, 91, 92, 93, 137, 136, 138, 139

[56] References Cited

U.S. PATENT DOCUMENTS

| | | | |
|---|---|---|---|
| 4,381,882 | 5/1983 | Sabine | 385/77 X |
| 4,615,581 | 10/1986 | Morimoto | 385/60 |
| 4,695,126 | 9/1987 | Cook | 385/58 X |
| 4,790,618 | 12/1988 | Abe | 385/33 |
| 4,805,976 | 2/1989 | Wilkening et al. | 385/84 |
| 4,875,754 | 10/1989 | Rao et al. | 385/84 X |
| 4,997,254 | 3/1991 | Ganev | 385/90 X |
| 5,062,682 | 11/1991 | Marazzi | 385/85 |
| 5,074,682 | 12/1991 | Uno et al. | 385/93 |
| 5,082,378 | 1/1992 | Muller et al. | 385/72 |
| 5,087,109 | 2/1992 | Ishizuka et al. | 385/34 |
| 5,140,660 | 8/1992 | Takahashi | 385/79 |
| 5,245,684 | 9/1993 | Terao et al. | 385/78 |
| 5,291,571 | 3/1994 | Kunikane et al. | 385/31 X |

FOREIGN PATENT DOCUMENTS 57-27215   2/1982   Japan ................................. 385/34

OTHER PUBLICATIONS

*Applied Optics*, "Beam–To–Fiber Coupling With Low Standing Wave Ratio"; (Reprint 48) vol. 19; No. 14; pp. 313–316; Jul. 15, 1980.
*Hewlett–Packard Journal*, "External–Cavity Laser Design and Wavelength Calibration"; Feb. 1993; pp. 20–27.

Primary Examiner—Brian Healy

[57] ABSTRACT

The present invention relates to a lensed fiber assembly having disposed therein an optical fiber, canted at an angle to the axis of light propagation, so as to adequately reduce back reflection of light into an optically active device coupled to the optical fiber. The design of the present invention enables quick and accurate alignment of the optical fiber with the active optical device by movement of the lensed fiber assembly either on axis with and/or orthogonal to the axis of light propagation.

14 Claims, 2 Drawing Sheets

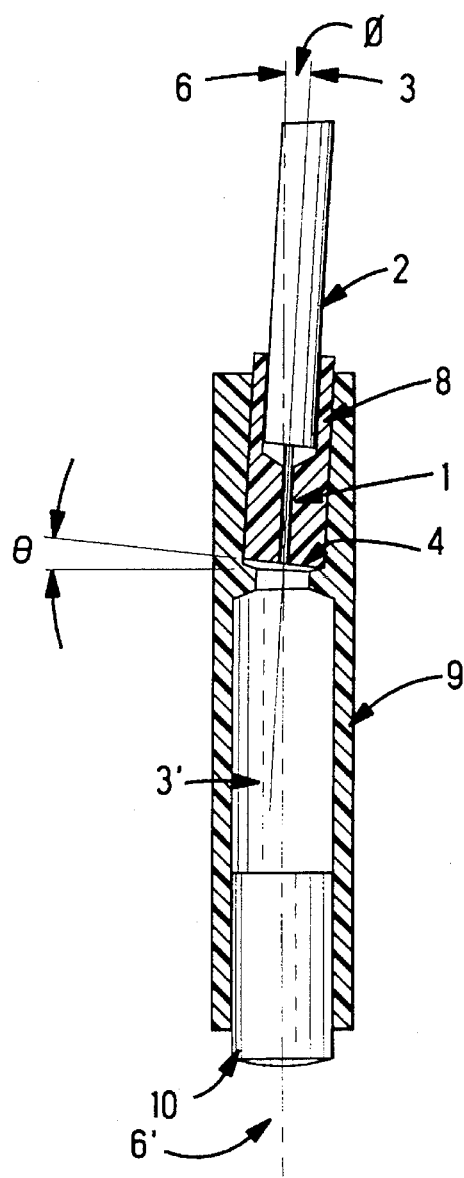
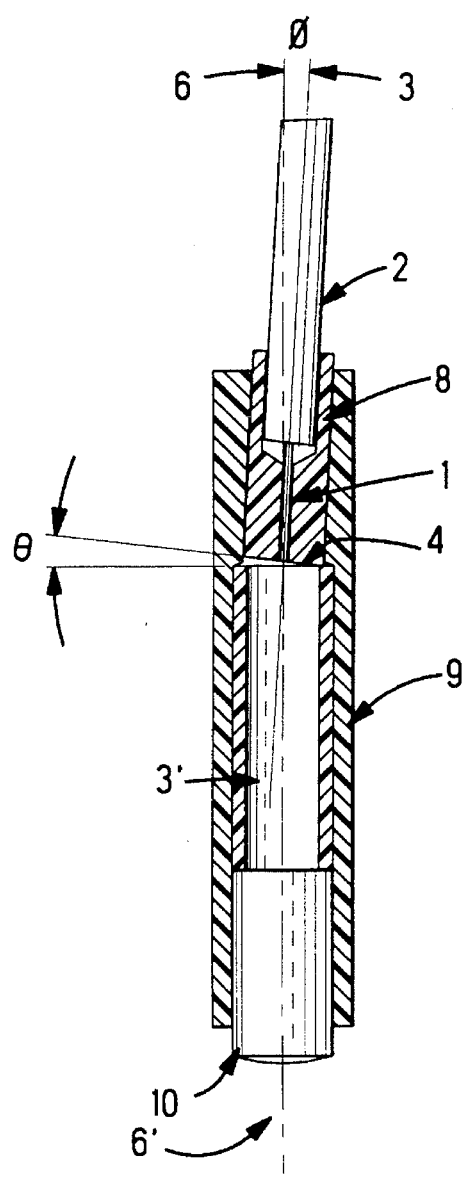
FIG. 2        FIG. 3
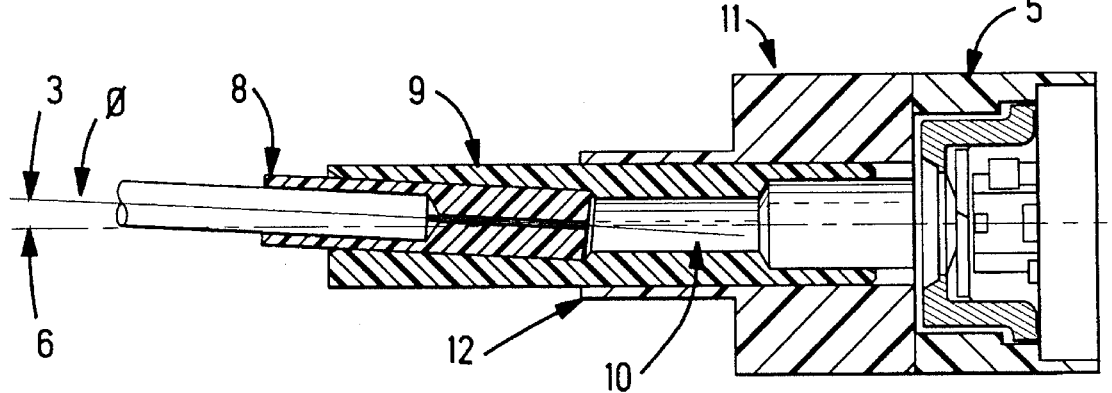
FIG. 4

LENSED OPTICAL FIBER ASSEMBLY AND PROCESS FOR ALIGNMENT WITH AN ACTIVE DEVICE

BACKGROUND OF THE INVENTION

1. Field of the Invention

The present invention relates to a lensed fiber assembly wherein an optical fiber is canted at an angle to the axis of light propagation.

2. Description of Related Art

In the field of fiber optic coupling it is desirable to reduce back reflection of an optical interface in an optical system, such as that between an active optical device and a fiber coupled thereto. A known method involves angling the end-face of an optical fiber by a small amount and then angling the emitted beam of, for instance a laser diode, relative to the end-face surface of the optical fiber by a slightly larger amount than the angle of the fiber end-face. The net effect is to have the emitted light reflect off the surface of the fiber end-face at a large total angle, in order to avoid interference with the light energy emitted from the laser diode. Light transmitted through the surface of the fiber is refracted at a known angle, related to the refractive index of the fiber optic material, so as to bend the light as close as possible to the fiber axis, resulting in a light beam which is well-coupled and guided down the fiber core.

Unfortunately, the alignment of the optical fiber with the active optical device is a time and labor intensive process, necessitating illumination of any lenses incorporated in the system with the light from the active optical device and movement of the optical fiber in many directions to find the precise position and angle necessary to optimally couple the light beam into the fiber.

The typical method for performing this geometrical alignment is to align an intermediate optical device, such as a GRIN lens, a ball lens or a hemispherical lens, slightly off-axis to the emitted light energy at the active optical device, thereby inducing an angle between the propagation axis of the light energy at the focussed spot on the far side of the lens and the original emission direction at the emitting surface of the active optical device. This angle is adjusted so the light energy aligns with the core of the optical fiber as described above.

This manner of alignment is complicated by the fact that with each movement along the axis of the emitted light (to peak or optimize the coupling of the emitted light into the fiber) a new lateral position has to be found to regain the light energy coupling. In an automated alignment system, the equipment has to make many corrections to the lateral position when optimizing the axial position so that the equipment can tell if the new axial position is indeed in an improved coupled position.

Ishizuka et al., U.S. Pat. No. 5,087,109, discloses a method for coupling a semiconductor laser with an optical fiber wherein the position of the semiconductor laser is deviated from the axis of the coupling lens by a value corresponding to the inclination angle of the optical fiber input end face, or the semiconductor laser is inclined. The Ishizuka et al. method is essentially the same as that described above.

U.S. Pat. No. 4,831,882 to Sabine discloses a termination for optical light guides which can be integrally formed at the ends of long light guides or attached as discrete termination pieces. A polarized light source is directed at an angle to the optical waveguide axis, similar to the above-described method. U.S. Pat. No. 4,695,126, discloses a method and apparatus for effecting light energy transmission with lessened reflection, wherein an optical fiber assembly has an inclined passage between end openings for residence of an optical fiber.

The disclosures of the above-cited references are incorporated by reference herein.

SUMMARY OF THE INVENTION

The present invention relates to an optical fiber/lens assembly for alignment with an active optical device having an elongated assembly housing with an outer surface substantially parallel to the longitudinal axis of the housing and a first cylindrical void disposed coincident to the longitudinal axis therein, the first void extending from a first end portion of the assembly housing and communicating with a second cylindrical void disposed at a preselected angle, θ, relative to the longitudinal axis, the second void terminating at a second end portion of the assembly housing; at least one lens disposed within the first cylindrical void; and an optical fiber disposed within the second cylindrical void, such that the optical axis of the optical fiber is disposed at the preselected angle, the optical fiber having a first end-face disposed at an angle, φ, to a plane orthogonal to the fiber axis and the end-face being positioned at a point in close proximity to where the first void communicates with the second void.

Another object of the present invention is an optical alignment system for aligning an active optical device with an optical fiber having (i) a substantially tubular optical bench with a longitudinal axis therein which defines a light energy optical axis and an interior void, the longitudinal axis of the interior void being coincident with the light energy optical axis; (ii) an active optical device disposed at a first end portion of said optical bench; and (iii) an optical fiber/lens assembly disposed within the interior cylindrical void of said optical bench, said optical fiber lens assembly having been described above.

Another object of the present invention is a process for aligning an optical fiber with an active optical device, comprising the steps of providing a substantially tubular optical bench having a longitudinal axis therein which defines a light energy optical axis and an interior void, the longitudinal axis of the interior void being coincident with the light energy optical axis; disposing an active optical device at a first end portion of the optical bench; inserting an elongated optical fiber/lens assembly into a second end portion of the optical bench, such that the assembly is supported within the interior void of the optical bench, the assembly comprising at least one lens disposed at a first end portion of the assembly and intersecting the light energy optical axis, and an optical fiber having a first end-face disposed at an angle, φ, to a plane orthogonal to the optical fiber axis, the optical fiber axis being canted at a predetermined angle, φ, relative to the light energy optical axis.

In order to achieve both efficient coupling of the light beam down the fiber and reduce back reflection of the emitted light, the present invention cants the optical fiber at an angle within an assembly containing both the optical fiber and any necessary lenses. The angle of the canted fiber is approximately equal to the off-set angle of the active optical device or lenses, as described in the prior art.

The advantage of the present invention is the quick and easy alignment of optical fibers with active optical devices which is facilitated by the present design.

The cant of the optical fiber enables the alignment process to be performed on the optical axis of the emitted light, rather than at angles thereto. All tooling to perform the alignment may be moved on or orthogonal to the optical axis and all piece-part mating surfaces may be orthogonal to the optical axis.

BRIEF DESCRIPTION OF THE DRAWINGS

The above and other objects, features and advantages of the present invention will be better understood from the following detailed descriptions taken in conjunction with the accompanying drawings, all of which are give by way of illustration only, and are not limitative of the present invention.

FIGS. 2 and 3 are cross-sectional views of the fiber optic/lens assembly of the present invention.

FIG. 4 is a cross-sectional view of the optical alignment system of the present invention, including an optical bench and a laser diode.

DETAILED DESCRIPTION OF THE INVENTION

Figure 1:
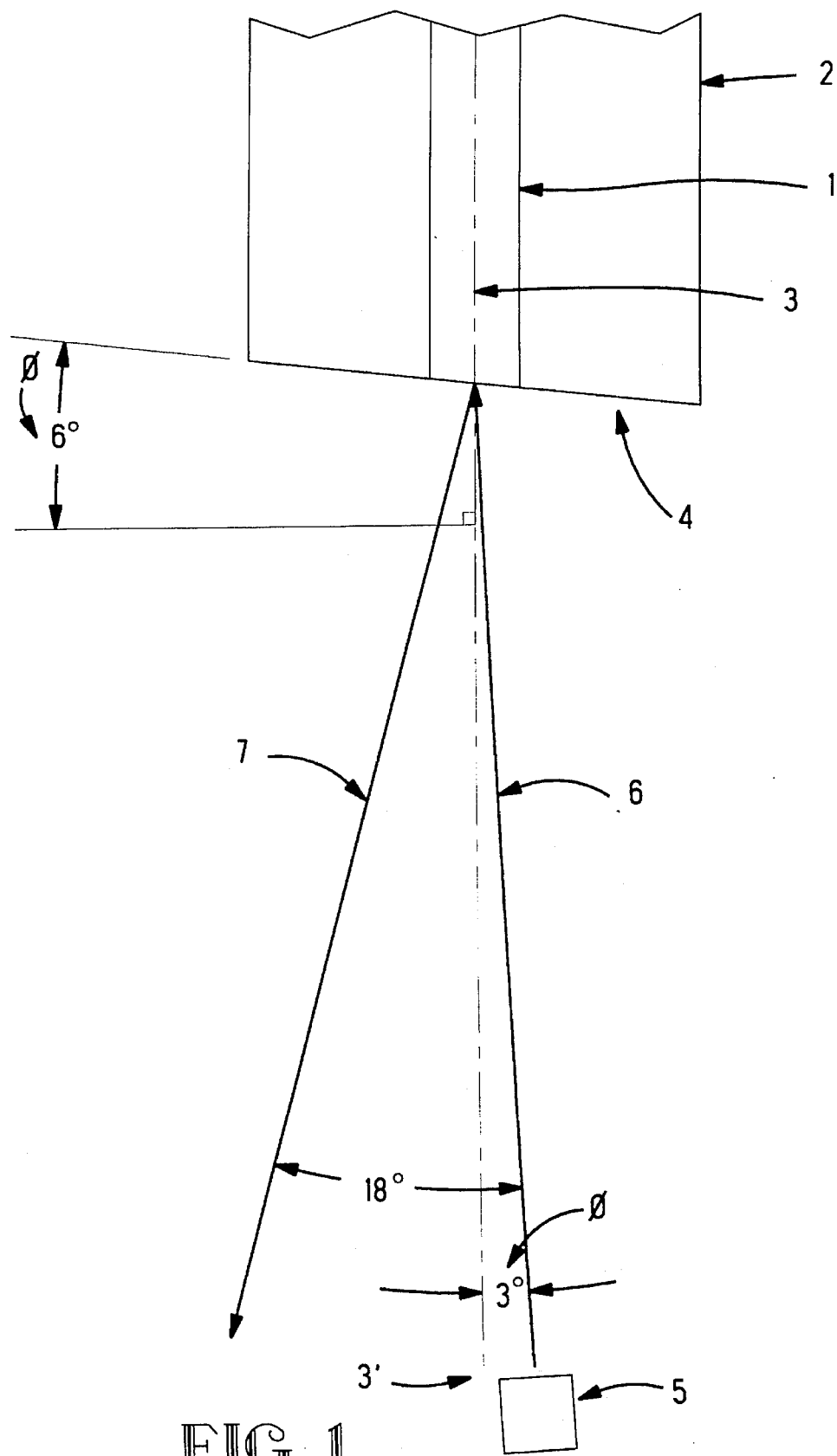
FIG. 1 is a graphical illustration of the alignment process of the prior art.

The following detailed description of the invention is provided to aid those skilled in the art in practicing the present invention. Even so, the following detailed description of the invention should not be construed to unduly limit the present invention, as modifications and variations in the embodiments herein discussed may be made by those of ordinary skill in the art without departing from the spirit or scope of the present inventive discovery.

The optical fiber/lens assembly of the present invention is an elongated and/or tubular housing which has an outer surface parallel to the longitudinal axis of the housing, and a first interior, cylindrical void having an axis coincident with the longitudinal axis of the housing, said first cylindrical void extending from a first end portion of said housing to an interior point within said housing, where it communicates with a second cylindrical void which is canted at a preselected angle of between about 2.5° to 4° relative to the axes of the housing and the first cylindrical void. The second cylindrical void extends from the interior point of communication with the first void, to a second, terminal end portion of said housing.

The optical fiber/lens assembly has disposed within the first cylindrical void at least one optical lens for focussing incoming light energy. Suitable lenses for use in the present invention include but not limited to GRIN, Ball, aspheric and holographic lenses.

Disposed at an angle relative to the longitudinal axis of the housing, within the second cylindrical void, is an optical fiber having an end-face which is polished at an angle of between about 5.5° to 8° to the plane orthogonal to the fiber axis, as is known in the art, to reduce back reflection. The end-face of the optical fiber is positioned at or near the focal point of the optical lens, such that light energy entering the optical lens and focussed thereby is directed onto the angled end-face of the optical fiber. The focussed light energy is coupled into the optical fiber and refracted toward the optical axis of the fiber.

The total included angle formed by the angled end-face of the optical fiber and the cant of the optical fiber within the assembly is optimized such that any light energy which is reflected from the end-face of the fiber is directed away from the optical axis of the system, so as to not interfere or be coupled with the incoming light energy.

Alignment of the present system with an active optical device, such as a laser diode or a light emitting diode, is quickly and easily performed by movements of the optical fiber/lens assembly either on-axis with or orthogonal to the axis of light propagation.

The advantage of the current design is that the outer surface of the optical fiber/lens assembly housing, which is substantially parallel to the emitted light energy axis, allows movement of the assembly along the light energy axis such that optimization of light coupling into the fiber is obtained quickly and easily. The assembly may be supported within a substantially tubular optical bench, which is designed to mate the optical fiber/lens assembly with the active optical device. The optical bench has a longitudinal axis therein which defines a light energy optical axis, when aligned with the active optical device, and an interior void, the longitudinal axis of said void being coincident with the light energy optical axis. When properly seated within the optical bench, the optical fiber/lens assembly is free to move longitudinally along the light energy axis, facilitating coupling of focussed light into the canted optical fiber.

The cross-sectional shapes of both the interior void of the optical bench and the optical fiber/lens assembly may be circular, square or rectangular, with the proviso that both must have the same cross-sectional shape and dimensions which enable insertion of the optical fiber/lens assembly into the interior void of the optical bench.

The alignment of the optical fiber with the optically active device is accomplished by a series of orthogonal movements of the optical bench in the lateral plane, in addition to the longitudinal movements described above.

Unlike the prior art, axial movement of the optical fiber no longer translates the end of the fiber through the axis of the emitted light, but rather moves the end-face along the axis of the light.

Automation of the alignment procedure is much easier in the present invention, as the axial position of the fiber end-face always intersects the light energy axis, eliminating the necessity of constantly realigning the fiber in the lateral plane.

FIG. 1 is an illustration of the prior art methodology of off-setting the optically active device, 5, from the optical axis, 3–3', of the optical fiber core, 1, at an angle, φ. The optical fiber has a protective cladding layer, 2, and the end-face of the optical fiber is polished in a plane at an angle, θ, to the plane orthogonal to the fiber axis. Light emitted, 6, from the optically active device is directed at the angled endface, most of which is coupled into the fiber core, but some of which is reflected, 7, at a high reflection angle, to avoid interference with the incoming light energy, 6.

FIGS. 2 and 3 illustrate two embodiments of the present invention. According to the present invention, the optical fiber/lens assembly is composed of an elongate or tubular housing 9, having a lens 10, disposed therein, coincident with the axis of the housing, 6–6'. Also disposed within the assembly housing is an optical fiber assembly, 8, containing an optical fiber, 1 and 2, the axis of which, 3–3', is canted at an angle, φ, relative to the axis of the housing/lens assembly. The optical fiber end-face, 4, is disposed at a preselected angle to the axis of the fiber.

FIG. 4 illustrates an embodiment of the entire optical alignment system of the present invention, wherein the optical fiber/lens assembly of FIGS. 2 or 3 is disposed within an interior void, 12, of a substantially tubular optical bench, 11, and supported therein. The entire optical bench/fiber/lens assembly is disposed in optical alignment with a laser diode, 5.

Alignment of the presently disclosed system is obtained by inserting the optical fiber/lens assembly into the optical bench. The longitudinal axis of interior void of the optical bench is to be aligned with the emitted light energy axis. Since the optical fiber/lens assembly has an outer surface parallel to its interior optical axis, when the optical fiber/lens assembly is disposed within the optical bench, the optical axis of the optical fiber/lens assembly is coincident with the longitudinal axis of the optical bench.

Lateral alignment of the optical fiber/lens assembly, and therefore the angled optical fiber contained therein, is achieved merely by movements of the optical bench orthogonal to the axis of light emitted by the laser diode. No axial movement is necessary.

Alignment of the fiber in the longitudinal direction, in order to best focus and couple light propagated from the lens into the fiber, is accomplished simply by movements of the optical fiber/lens assembly in the longitudinal direction, within the optical bench and on-axis with the light energy propagated from the lens. Clearly, no lateral movement is necessary to effect alignment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An optical fiber/lens assembly for alignment with an active optical device, comprising:

an elongated assembly housing having an outer surface substantially parallel to the longitudinal axis of said housing and a first cylindrical void disposed coincident to the longitudinal axis therein, said first void extending from a first end portion of said assembly housing and communicating with a second cylindrical void disposed at a preselected angle, $\theta$, relative to said longitudinal axis, said second void terminating at a second end portion of said assembly housing;

at least one lens disposed within said first cylindrical void; and an optical fiber disposed within said second cylindrical void, such that the optical axis of said optical fiber is disposed at said preselected angle, said optical fiber having a first end-face disposed at an angle, $\phi$, to a plane orthogonal to the fiber axis and said end-face being positioned at a point in close proximity to where said first void communicates with said second void.

2. The assembly of claim 1, wherein said angles, $\theta$ and $\phi$, are selected so as to minimize back reflection of light entering said optical fiber along the longitudinal axis of said assembly housing and to maximize the optical coupling of light refracted into said fiber.

3. The assembly of claim 2, wherein said optical fiber end-face forms an angle of about 9° with a plane orthogonal to said longitudinal axis of said assembly housing.

4. The assembly of claim 3, wherein said angle $\theta$ is about 3°.

5. The assembly of claim 3, wherein said angle $\phi$ is about 6°.

6. An optical alignment system for aligning an active optical device with an optical fiber, comprising:

(i) a substantially tubular optical bench having a longitudinal axis therein which defines a light energy optical axis and an interior void, the longitudinal axis of said interior void being coincident with the light energy optical axis;

(ii) an active optical device disposed at a first end portion of said optical bench; and (iii) an optical fiber/lens assembly disposed within the interior cylindrical void of said optical bench, said optical fiber lens assembly comprising:

(a) an elongated assembly housing having an outer surface substantially parallel to the longitudinal axis of said housing and a first cylindrical void disposed coincident to the longitudinal axis therein, said first void extending from a first end portion of said assembly housing and communicating with a second cylindrical void disposed at a preselected angle, $\theta$, relative to said longitudinal axis, said second void terminating at a second end portion of said assembly housing;

(b) at least one lens disposed within said first cylindrical void; and (c) an optical fiber disposed within said second cylindrical void, such that the optical axis of said optical fiber is disposed at said preselected angle, said optical fiber having a first end-face disposed at an angle, $\phi$, relative to a plane orthogonal to the fiber axis and said end-face being positioned at a point in close proximity to where said first void communicates with said second void;

wherein the interior cylindrical void of said optical bench has an interior surface which acts to guide the exterior surface of said optical fiber/lens assembly housing, such that said optical fiber is disposed in optical alignment with said active optical device.

7. The system of claim 6, wherein said angles, $\theta$ and $\phi$, are selected so as to minimize back reflection of light entering said optical fiber along the light energy optical axis and to maximize the optical coupling of light refracted into said fiber.

8. The system of claim 6, wherein said active optical device is a laser diode.

9. The system of claim 6, wherein said active optical device is a light emitting diode.

10. The system of claim 7, wherein said optical fiber end-face forms an angle of about 9° with a plane orthogonal to said light energy optical axis.

11. A process for aligning an optical fiber with an active optical device, comprising:

providing a substantially tubular optical bench having a longitudinal axis therein which defines a light energy optical axis and an interior void, the longitudinal axis of said interior void being coincident with the light energy optical axis;

disposing an active optical device at a first end portion of said optical bench;

inserting an elongated optical fiber/lens assembly into a second end portion of said optical bench, such that said assembly is supported within said interior void in said optical bench, said assembly comprising at least one lens disposed at a first end portion of said assembly and intersecting the light energy optical axis, and an optical fiber having a first end-face disposed at an angle, $\phi$, to a plane orthogonal to the optical fiber axis, said optical fiber axis being canted at a predetermined angle, θ, relative to said light energy optical axis.

12. The process of claim 11, wherein said angles, φ and θ, are selected so as to minimize back reflection of light entering said optical fiber along the light energy optical axis and to maximize the optical coupling of light refracted into said fiber.

13. The process of claim 11, further comprising a step of aligning the optical bench with the active optical device in directions orthogonal to the light energy optical axis, so as to maximize the light energy entering said optical fiber.

14. The process of claim 11, further comprising a step of aligning the optical fiber/lens assembly in the longitudinal direction, by movements along the light energy optical axis, so as to maximize the light energy entering said optical fiber.

* * * * *